US010119337B2

(12) United States Patent
Ling

(10) Patent No.: US 10,119,337 B2
(45) Date of Patent: Nov. 6, 2018

(54) MODELING OF INTERACTIONS BETWEEN FORMATION AND DOWNHOLE DRILLING TOOL WITH WEARFLAT

(71) Applicant: Halliburton Energy Services, Inc., Houston, TX (US)

(72) Inventor: Xianwu Ling, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/120,080

(22) PCT Filed: Nov. 20, 2014

(86) PCT No.: PCT/US2014/066533
§ 371 (c)(1),
(2) Date: Aug. 18, 2016

(87) PCT Pub. No.: WO2016/080994
PCT Pub. Date: May 26, 2016

(65) Prior Publication Data
US 2017/0058613 A1    Mar. 2, 2017

(51) Int. Cl.
*G06G 7/48* (2006.01)
*E21B 10/42* (2006.01)
(Continued)

(52) U.S. Cl.
CPC .............. *E21B 10/42* (2013.01); *E21B 10/43* (2013.01); *G06F 17/5009* (2013.01);
(Continued)

(58) Field of Classification Search
None
See application file for complete search history.

(56) References Cited

U.S. PATENT DOCUMENTS 5,131,478 A * 7/1992 Brett .................. E21B 10/43
175/399
5,216,917 A * 6/1993 Detournay .............. E21B 12/02
175/39
(Continued)

FOREIGN PATENT DOCUMENTS

CN          101351615          1/2009
CN          103827435          5/2014
(Continued)

OTHER PUBLICATIONS

Richard, Thomas et al., "A Simplified Model to Explore the Root Cause of Stick-Slip Vibrations in Drilling Systems with Drag Bits", Jun. 13, 2007, Journal of Sound and Vibration 305, Elsevier Ltd.*
(Continued)

*Primary Examiner* — Cedric Johnson
(74) *Attorney, Agent, or Firm* — Baker Botts L.L.P.

(57) ABSTRACT

A computer-implemented method of designing a downhole drilling tool may include generating a three dimensional (3D) downhole drilling tool model including a plurality of cutting elements on a plurality of blades and simulating engagement of the 3D downhole drilling tool model with a 3D model of a borehole bottom. The method may further include calculating a cutting force of a cutting element of the plurality of cutting elements, calculating a wearflat frictional force of the cutting element, and modeling a drilling efficiency of the 3D downhole drilling tool model based on the cutting force of the cutting element and the wearflat friction force of the cutting element. In addition, the method may include determining a design parameter of the 3D downhole drilling tool model based on the drilling efficiency of the 3D downhole drilling tool model.

6 Claims, 8 Drawing Sheets

(51) Int. Cl.
  *E21B 10/43* (2006.01)
  *G06F 17/50* (2006.01)
  *E21B 10/54* (2006.01)

(52) U.S. Cl.
  CPC .......... *G06F 17/5086* (2013.01); *E21B 10/54* (2013.01); *G06F 2217/12* (2013.01); *G06F 2217/16* (2013.01)

(56) References Cited

U.S. PATENT DOCUMENTS

| | | | |
|---|---|---|---|
| 5,323,648 | A | 6/1994 | Pelitier et al. |
| 5,415,030 | A | 5/1995 | Jogi et al. |
| 5,670,711 | A | 9/1997 | Detournay et al. |
| 8,037,951 | B2 | 10/2011 | Shen et al. |
| 8,150,667 | B2 | 4/2012 | Ledgerwood |
| 8,185,366 | B2 | 5/2012 | Huang et al. |
| 8,437,995 | B2 | 5/2013 | Matthews et al. |
| 8,589,124 | B2 | 11/2013 | Huang |
| 8,720,611 | B2 | 5/2014 | Chen |
| 9,404,312 | B2 | 8/2016 | Azar et al. |
| 2005/0015229 | A1* | 1/2005 | Huang .................... E21B 10/00 703/10 |
| 2005/0133272 | A1 | 6/2005 | Huang et al. |
| 2007/0106487 | A1 | 5/2007 | Gavia et al. |
| 2009/0166091 | A1 | 7/2009 | Matthews et al. |
| 2011/0284293 | A1* | 11/2011 | Shen .................... E21B 10/006 175/338 |
| 2012/0152624 | A1 | 6/2012 | Chen |
| 2012/0272174 | A1 | 10/2012 | Vogel et al. |
| 2013/0054203 | A1 | 2/2013 | Herbig et al. |
| 2014/0095134 | A1 | 4/2014 | Cariveau et al. |
| 2014/0110181 | A1 | 4/2014 | Zhange et al. |

FOREIGN PATENT DOCUMENTS

| | | |
|---|---|---|
| EP | 0467580 | 10/1994 |
| SU | 1167296 | 7/1985 |
| WO | 2014/059106 | 4/2014 |
| WO | 2014/078342 | 5/2014 |
| WO | 2016/018394 | 2/2016 |

OTHER PUBLICATIONS

Glowka, David A., "Development of a Method for Predicting the Performance and Wear of PDC Drill Bits", Sep. 1987, Sandia Report, Sandia National Laboratories.*
International Search Report and Written Opinion, Application No. PCT/US2014/066533; 14 pg, (Jul. 24, 2015).
Detournay E., Defourny P., "Phenomenological model for the drilling action of drag bits," Int. J. Rock Mech. Min. Sci. Geomech Abstr., 29(1), 13-23, 1992.
Chiaia, Bernardino et al., "Mathematical Modelling of the Mechanics of Core Drilling in Geomaterials," Machining Science and Technology, 17:1-25, 25 pgs, 2013.
M. Yahiaoui, Laurent Gerbaud, Jean-Yves Paris, Jean Denape, Alfazazi Dourfaye; "A study on PDC drill bits quality;" Wear, Elsevier, 2013, 298-299, pp. 32-41; 10 pages, 2013.
Glowka, David A., "Development of a method for predicting the performance and wear of PDC drill bits," Sandia National Laboratories, SAND86, 1745, UC 66c; 206 pages, 1987.
International Preliminary Report on Patentability, Application No. PCT/US2014/066533; 6 pgs, (May 23, 2017).
Office Action for Chinese Patent Application No. 201480082802.X, dated Aug. 28, 2018, no English translation; 6 pages.

* cited by examiner

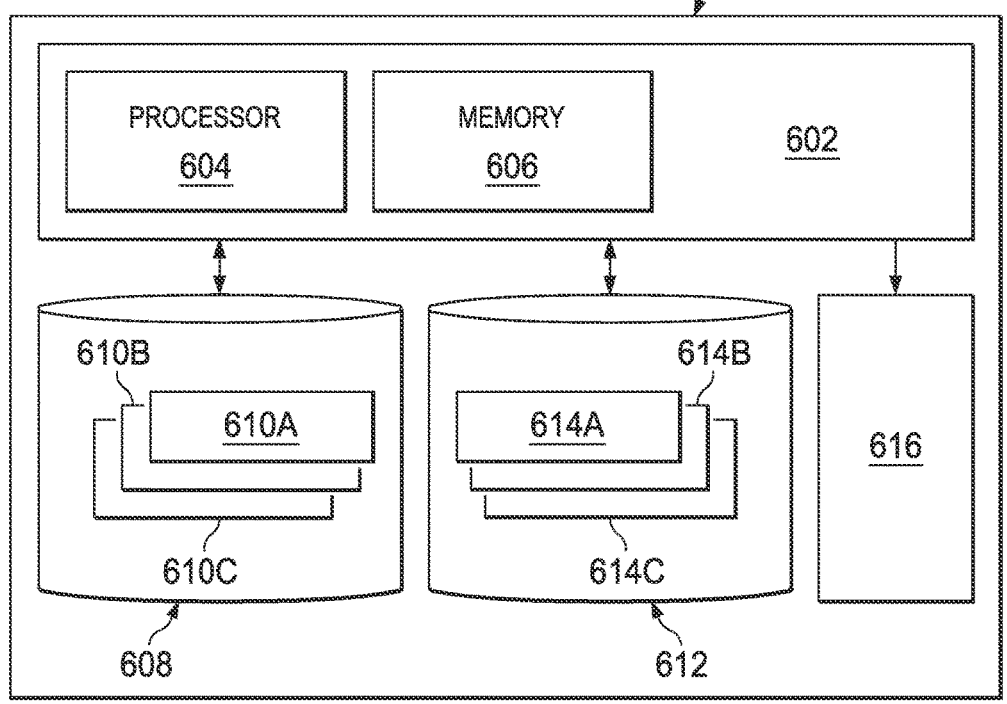

MODELING OF INTERACTIONS BETWEEN FORMATION AND DOWNHOLE DRILLING TOOL WITH WEARFLAT

RELATED APPLICATIONS

This application is a U.S. National Stage Application of International Application No. PCT/US2014/066533 filed Nov. 20, 2014, which designates the United States, and which is incorporated herein by reference in its entirety.

TECHNICAL FIELD

The present disclosure relates generally to downhole drilling tools and, more particularly, to modeling of interactions between downhole drilling tools and formations.

BACKGROUND

Various types of tools are used to form wellbores in subterranean formations for recovering hydrocarbons such as oil and gas lying beneath the surface. Examples of such tools include rotary drill bits, hole openers, reamers, and coring bits. Rotary drill bits include, but are not limited to, fixed cutter drill bits, such as polycrystalline diamond compact (PDC) drill bits, drag bits, matrix drill bits, rock bits, and roller cone drill bits. A fixed cutter drill bit typically includes multiple blades each having multiple cutting elements, such as the PDC cutting elements on a PDC bit.

In typical drilling applications, a PDC bit may be used to drill through various levels or types of geological formations. Typical formations may generally have a relatively low compressive strength in the upper portions (e.g., lesser drilling depths) of the formation and a relatively high compressive strength in the lower portions (e.g., greater drilling depths) of the formation. Thus, it typically becomes increasingly more difficult to drill at increasingly greater depths. Accordingly, the ideal bit for optimizing drilling efficiency typically changes as a function of the type of geological formation and the drilling depth.

One example model that has been used to model efficiency of drilling tools is known as a single cutter force model. Single cutter force models may calculate forces acting on individual cutting elements. Downhole drilling tool models may sum the forces acting on individual cutting elements to estimate total forces acting on the drilling tool.

BRIEF DESCRIPTION OF THE DRAWINGS

For a more complete understanding of the present disclosure and its features and advantages, reference is now made to the following description, taken in conjunction with the accompanying drawings, in which:

FIG. 6 illustrates a block diagram of an exemplary downhole drilling tool modeling system.

DETAILED DESCRIPTION

A downhole drilling tool model and related systems and methods are disclosed, directed to modeling drilling efficiency of downhole drilling tools. In a drill bit model, the efficiency of the modeled drill bit may be considered as a function of the drilling energy required for a given volume of rock removed from a formation. In broad terms, one aspect of the disclosed drilling tool model takes into consideration different sources of effective energy consumption during a simulated drilling run. For example, the drilling tool model may separately consider the effective energy consumed by the rock that is removed during a simulated drilling run, as well as various friction forces that may consume energy (e.g., the friction on a wearflat section of a cutting element). By separately considering the different sources of energy consumption during a simulated drilling run, the disclosed models may accurately analyze and/or predict the drilling efficiency of downhole drilling tool models. There are numerous ways in which the different sources of energy consumption may be considered and factored into downhole drilling tool models. Thus, embodiments of the present disclosure and its advantages are best understood by referring to FIGS. 1 through 7, where like numbers are used to indicate like and corresponding parts.

Figure 1:
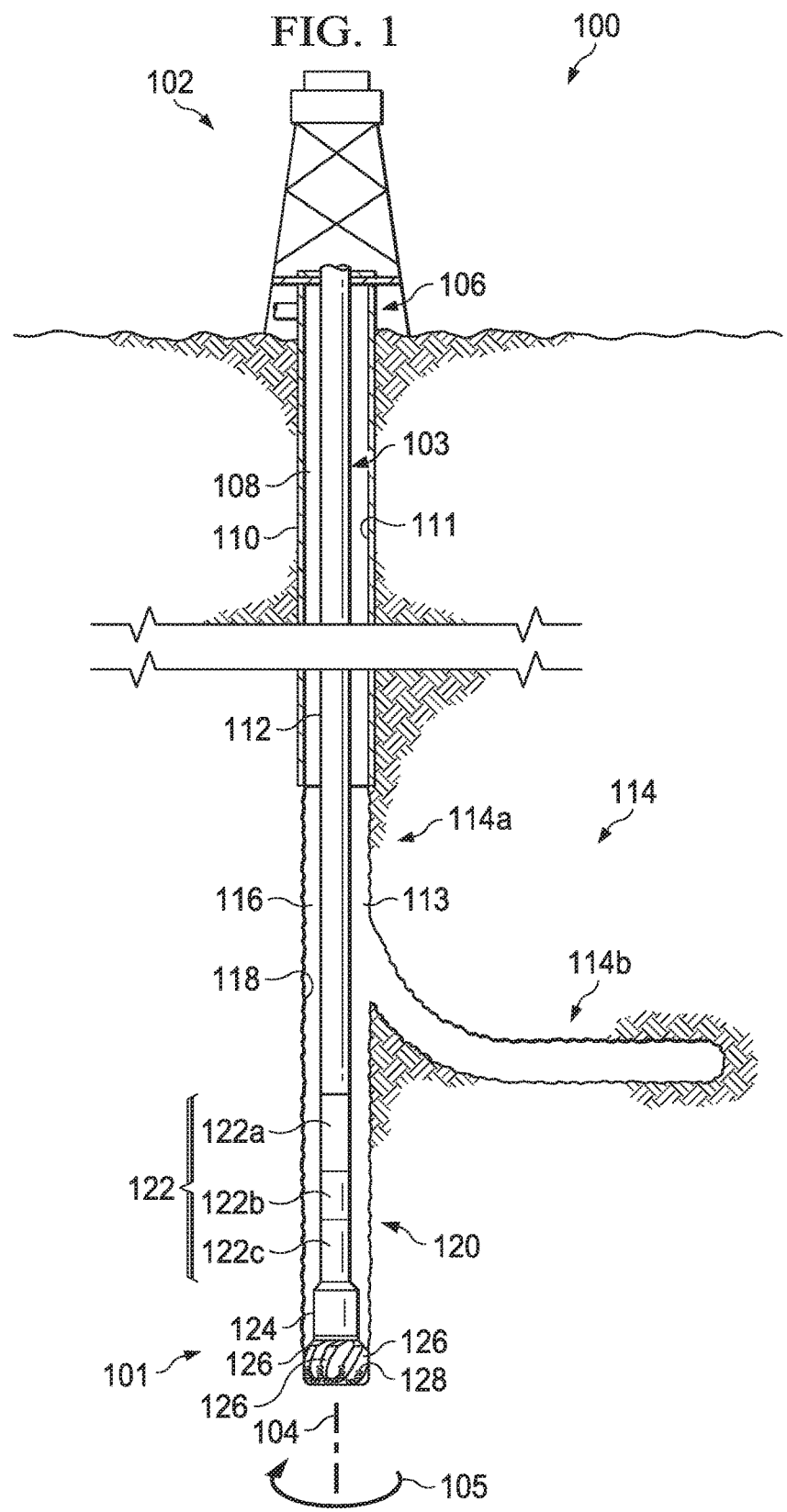
FIG. 1 illustrates an elevation view of an example embodiment of a drilling system.

FIG. 1 illustrates an elevation view of an example embodiment of drilling system 100. Drilling system 100 may include well surface or well site 106. Various types of drilling equipment such as a rotary table, drilling fluid pumps and drilling fluid tanks (not expressly shown) may be located at well surface or well site 106. For example, well site 106 may include drilling rig 102 that may have various characteristics and features associated with a "land drilling rig." However, downhole drilling tools incorporating teachings of the present disclosure may be satisfactorily used with drilling equipment located on offshore platforms, drill ships, semi-submersibles and drilling barges (not expressly shown).

Drilling system 100 may also include drill string 103 associated with drill bit 101 that may be used to form a wide variety of wellbores or bore holes such as generally vertical wellbore 114a or generally horizontal wellbore 114b or any combination thereof. Various directional drilling techniques and associated components of bottom hole assembly (BHA) 120 of drill string 103 may be used to form horizontal wellbore 114b. For example, lateral forces may be applied to BHA 120 proximate kickoff location 113 to form generally horizontal wellbore 114b extending from generally vertical wellbore 114a. The term "directional drilling" may be used to describe drilling a wellbore or portions of a wellbore that extend at a desired angle or angles relative to vertical. The desired angles may be greater than normal variations associated with vertical wellbores. Direction drilling may also be described as drilling a wellbore deviated from vertical. The term "horizontal drilling" may be used to include drilling in a direction approximately ninety degrees (90°) from vertical.

BHA 120 may be formed from a wide variety of components configured to form wellbore 114. For example, components 122a, 122b and 122c of BHA 120 may include, but are not limited to, drill bits (e.g., drill bit 101), coring bits, drill collars, rotary steering tools, directional drilling tools, downhole drilling motors, reamers, hole enlargers or stabilizers. The number and types of components 122 included in BHA 120 may depend on anticipated downhole drilling conditions and the type of wellbore that will be formed by drill string 103 and rotary drill bit 101. BHA 120 may also include various types of well logging tools (not expressly shown) and other downhole tools associated with directional drilling of a wellbore. Examples of logging tools and/or directional drilling tools may include, but are not limited to, acoustic, neutron, gamma ray, density, photoelectric, nuclear magnetic resonance, rotary steering tools and/or any other commercially available well tool. Further, BHA 120 may also include a rotary drive (not expressly shown) connected to components 122a, 122b and 122c and which rotates at least part of drill string 103 together with components 122a, 122b and 122c.

Wellbore 114 may be defined in part by casing string 110 that may extend from well surface 106 to a selected downhole location. Portions of wellbore 114, as shown in FIG. 1, that do not include casing string 110 may be described as "open hole." Various types of drilling fluid may be pumped from well surface 106 through drill string 103 to attached drill bit 101. The drilling fluids may be directed to flow from drill string 103 to respective nozzles (depicted as nozzles 156 in FIG. 2) passing through rotary drill bit 101. The drilling fluid may be circulated back to well surface 106 through annulus 108 defined in part by outside diameter 112 of drill string 103 and inside diameter 118 of wellbore 114a. Inside diameter 118 may be referred to as the "sidewall" of wellbore 114a. Annulus 108 may also be defined by outside diameter 112 of drill string 103 and inside diameter 111 of casing string 110. Open hole annulus 116 may be defined as sidewall 118 and outside diameter 112.

Drilling system 100 may also include rotary drill bit ("drill bit") 101. Drill bit 101, discussed in further detail in FIG. 2, may include one or more blades 126 that may be disposed outwardly from exterior portions of rotary bit body 124 of drill bit 101. Blades 126 may be any suitable type of projections extending outwardly from rotary bit body 124. Drill bit 101 may rotate with respect to bit rotational axis 104 in a direction defined by directional arrow 105. Blades 126 may include one or more cutting elements 128 disposed outwardly from exterior portions of each blade 126. Blades 126 may also include one or more depth of cut controllers (not expressly shown) configured to control the depth of cut of cutting elements 128. Blades 126 may further include one or more gage pads (not expressly shown) disposed on blades 126. Drill bit 101 may be designed and formed in accordance with teachings of the present disclosure and may have many different designs, configurations, and/or dimensions according to the particular application of drill bit 101.

The configuration of cutting elements 128 on drill bit 101 and/or other downhole drilling tools may also contribute to the drilling efficiency of the drill bit. Cutting elements 128 may be laid out according to two general principles: single-set and track-set. In a single-set configuration, each of cutting elements 128 on drill bit 101 may have a unique radial position with respect to bit rotational axis 104. In a track-set configuration, at least two of cutting elements 128 of drill bit 101 may have the same radial position with respect to bit rotational axis 104. Track-set cutting elements may be located on different blades of the drill bit. Drill bits having cutting elements laid out in a single-set configuration may drill more efficiently than drill bits having a track-set configuration while drill bits having cutting elements laid out in a track-set configuration may be more stable than drill bits having a single-set configuration.

It may be advantageous to model a drilling efficiency of a downhole drilling tool by incorporating interactions between downhole drilling tools and rock chips, as disclosed in further detail below. For example, during operation of drilling system 100, when drill bit 101 contacts the bottom of wellbore 114a or the end of horizontal wellbore 114b, blades 126 or cutting elements 128 may mechanically scrape the formations surrounding wellbores 114, causing pieces of rock to separate from the formations. Drill bit 101 may further cause rock chips to separate from the formations in advance of blades 126 or cutting elements 128. The amount of energy required to separate a particular volume of rock from a formation may correlate to the drilling efficiency of a drill bit.

While drilling into different types of geological formations it may be advantageous to optimize the design or model the drilling efficiency of downhole drilling tools in order to select a downhole drilling tool that maximizes drilling efficiency. As disclosed in further detail below, downhole drilling models (not expressly shown in FIG. 1) may be used to select high efficiency downhole drilling tools (e.g., a drill bit, a reamer, a hole opener, etc.) from a group of available downhole drilling tools. A downhole drilling model may include a downhole drilling tool model (e.g., a model of a drill bit) and a borehole bottom model, and may be configured to model the interaction of the downhole drilling tool model and the borehole bottom model during a simulated drilling run. A downhole drilling tool model may also be configured to optimize a design of a downhole drilling tool, such as a drill bit, to increase drilling efficiency.

Drill bit 101 may be designed or manufactured in accordance with teachings of the present disclosure and may have different designs, configurations, and/or dimensions according to a particular application of drill bit 101. A downhole drilling model may be configured to analyze an efficiency of a downhole drilling tool by modeling interactions between the downhole drilling tool and rock chips from the formation. The downhole drilling model may also be configured to design or select a high efficiency downhole drilling tool based on a downhole drilling model utilizing shape-based modeling of the cutting forces of the respective cutting elements of a downhole drilling tool (e.g., a drill bit) and/or modeling of rock chip interactions associated with the downhole drilling tool. A downhole drilling model according to the present disclosure may improve accuracy of predictions of drilling efficiencies of downhole drilling tools.

Figure 2:
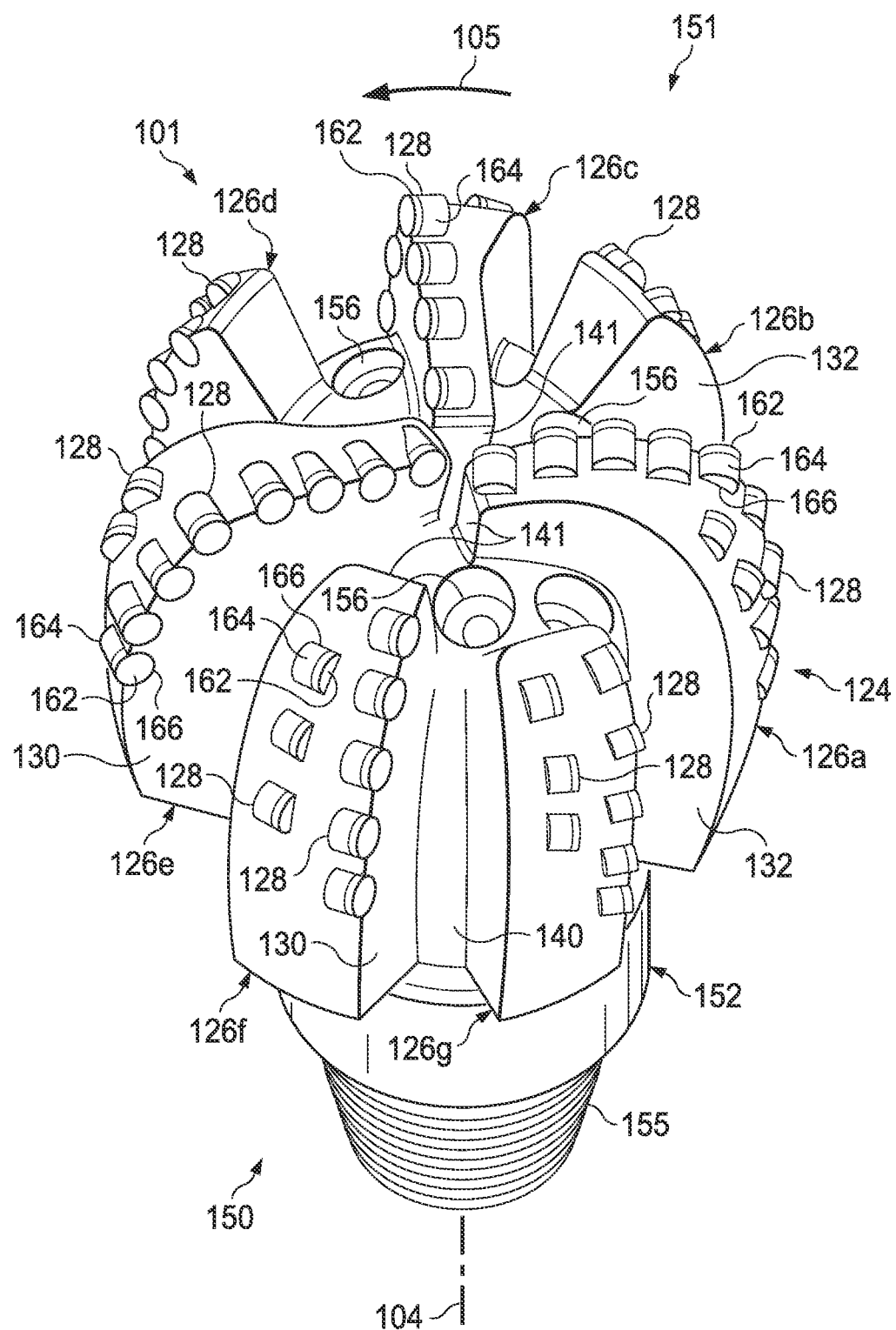
FIG. 2 illustrates an isometric view of a rotary drill bit oriented upwardly in a manner often used to model or design fixed cutter drill bits.

FIG. 2 illustrates an isometric view of rotary drill bit 101 oriented upwardly in a manner often used to model or design fixed cutter drill bits. Drill bit 101 may be any of various types of rotary drill bits, including fixed cutter drill bits, polycrystalline diamond compact (PDC) drill bits, drag bits, matrix drill bits, and/or steel body drill bits operable to form a wellbore (e.g., wellbore 114 as illustrated in FIG. 1) extending through one or more downhole formations. Drill bit 101 may be designed and formed in accordance with teachings of the present disclosure and may have many different designs, configurations, and/or dimensions according to the particular application of drill bit 101.

Drill bit 101 may include one or more blades 126 (e.g., blades 126a-126g) that may be disposed outwardly from exterior portions of bit body 124 of drill bit 101. Blades 126 may be any suitable type of projections extending outwardly from bit body 124. For example, a portion of blade 126 may be directly or indirectly coupled to an exterior portion of bit body 124, while another portion of blade 126 may be projected away from the exterior portion of bit body 124. Blades 126 formed in accordance with teachings of the present disclosure may have a wide variety of configurations including, but not limited to, substantially arched, generally helical, spiraling, tapered, converging, diverging, symmetrical, and/or asymmetrical. In some embodiments, one or more blades 126 may have a substantially arched configuration extending from proximate rotational axis 104 of drill bit 101. The arched configuration may be defined in part by a generally concave, recessed shaped portion extending from proximate bit rotational axis 104. The arched configuration may also be defined in part by a generally convex, outwardly curved portion disposed between the concave, recessed portion and exterior portions of each blade which correspond generally with the outside diameter of the rotary drill bit.

Each of blades 126 may include a first end disposed proximate or toward bit rotational axis 104 and a second end disposed proximate or toward exterior portions of drill bit 101 (e.g., disposed generally away from bit rotational axis 104 and toward uphole portions of drill bit 101). The terms "uphole" and "downhole" may be used to describe the location of various components of drilling system 100 relative to the bottom or end of wellbore 114 shown in FIG. 1. For example, a first component described as uphole from a second component may be further away from the end of wellbore 114 than the second component. Similarly, a first component described as being downhole from a second component may be located closer to the end of wellbore 114 than the second component.

Blades 126a-126g may include primary blades disposed about the bit rotational axis. For example, blades 126a, 126c, and 126e may be primary blades or major blades because respective first ends 141 of each of blades 126a, 126c, and 126e may be disposed closely adjacent to bit rotational axis 104 of drill bit 101. Blades 126a-126g may also include at least one secondary blade disposed between the primary blades. In the illustrated embodiment, blades 126b, 126d, 126f, and 126g on drill bit 101 may be secondary blades or minor blades because respective first ends 141 may be disposed on downhole end 151 of drill bit 101 a distance from associated bit rotational axis 104. The number and location of primary blades and secondary blades may vary such that drill bit 101 includes more or less primary and secondary blades. Blades 126 may be disposed symmetrically or asymmetrically with regard to each other and bit rotational axis 104 where the location of blades 126 may be based on the downhole drilling conditions of the drilling environment. Blades 126 and drill bit 101 may rotate about rotational axis 104 in a direction defined by directional arrow 105.

Each of blades 126 may have respective leading or front surfaces 130 in the direction of rotation of drill bit 101 and trailing or back surfaces 132 located opposite of leading surface 130 away from the direction of rotation of drill bit 101. Blades 126 may be positioned along bit body 124 such that they have a spiral configuration relative to bit rotational axis 104. Blades 126 may also be positioned along bit body 124 in a generally parallel configuration with respect to each other and bit rotational axis 104.

Blades 126 may include one or more cutting elements 128 disposed outwardly from exterior portions of each blade 126. For example, a portion of cutting element 128 may be directly or indirectly coupled to an exterior portion of blade 126 while another portion of cutting element 128 may be projected away from the exterior portion of blade 126. By way of example and not limitation, cutting elements 128 may be various types of cutters, compacts, buttons, inserts, and gage cutters satisfactory for use with a wide variety of drill bits 101. Although FIG. 2 illustrates two rows of cutting elements 128 on blades 126, drill bits designed and manufactured in accordance with the teachings of the present disclosure may have one row of cutting elements or more than two rows of cutting elements.

Cutting elements 128 may be any suitable device configured to cut into a formation, including but not limited to, primary cutting elements, back-up cutting elements, secondary cutting elements or any combination thereof. Cutting elements 128 may include respective substrates 164 with a layer of hard cutting material (e.g., cutting table 162) disposed on one end of each respective substrate 164. The hard layer of cutting elements 128 may provide a cutting surface that may engage adjacent portions of a downhole formation to form wellbore 114 as illustrated in FIG. 1. The contact of the cutting surface with the formation may form a cutting zone (not expressly illustrated in FIGS. 1 and 2) associated with each of cutting elements 128. For example, the cutting zone may be formed by the two-dimensional area, on the face of a cutting element, that comes into contact with the formation, and cuts into the formation. The edge of the portion of cutting element 128 located within the cutting zone may be referred to as the cutting edge of a cutting element 128.

Each substrate 164 of cutting elements 128 may have various configurations and may be formed from tungsten carbide or other suitable materials associated with forming cutting elements for rotary drill bits. Tungsten carbides may include, but are not limited to, monotungsten carbide (WC), ditungsten carbide ($W_2C$), macrocrystalline tungsten carbide and cemented or sintered tungsten carbide. Substrates may also be formed using other hard materials, which may include various metal alloys and cements such as metal borides, metal carbides, metal oxides and metal nitrides. For some applications, the hard cutting layer may be formed from substantially the same materials as the substrate. In other applications, the hard cutting layer may be formed from different materials than the substrate. Examples of materials used to form hard cutting layers may include polycrystalline diamond materials, including synthetic polycrystalline diamonds. Blades 126 may include recesses or bit pockets 166 that may be configured to receive cutting elements 128. For example, bit pockets 166 may be concave cutouts on blades 126.

Blades 126 may also include one or more depth of cut controllers (DOCCs) (not expressly shown) configured to control the depth of cut of cutting elements 128. A DOCC may include an impact arrestor, a back-up or second layer cutting element and/or a Modified Diamond Reinforcement (MDR). Exterior portions of blades 126, cutting elements 128 and DOCCs (not expressly shown) may form portions of the bit face.

Blades 126 may further include one or more gage pads (not expressly shown) disposed on blades 126. A gage pad may be a gage, gage segment, or gage portion disposed on exterior portion of blade 126. Gage pads may contact adjacent portions of a wellbore (e.g., wellbore 114 as illustrated in FIG. 1) formed by drill bit 101. Exterior portions of blades 126 and/or associated gage pads may be disposed at various angles (e.g., positive, negative, and/or parallel) relative to adjacent portions of generally vertical wellbore 114a. A gage pad may include one or more layers of hardfacing material.

Uphole end 150 of drill bit 101 may include shank 152 with drill pipe threads 155 formed thereon. Threads 155 may be used to releasably engage drill bit 101 with BHA 120 whereby drill bit 101 may be rotated relative to bit rotational axis 104. Downhole end 151 of drill bit 101 may include a plurality of blades 126a-126g with respective junk slots or fluid flow paths 140 disposed therebetween. Additionally, drilling fluids may be communicated to one or more nozzles 156.

A drill bit operation may be expressed in terms of depth of cut per revolution as a function of drilling depth. Depth of cut per revolution, or "depth of cut," may be determined by rate of penetration (ROP) and revolution per minute (RPM). ROP may represent the amount of formation that is removed as drill bit 101 rotates and may be expressed in units of ft/hr. Further, RPM may represent the rotational speed of drill bit 101. Actual depth of cut ($\Delta$) may represent a measure of the depth that cutting elements cut into the formation during a rotation of drill bit 101. Thus, actual depth of cut may be expressed as a function of actual ROP and RPM using the following equation:

$$\Delta = ROP/(5*RPM)$$

Actual depth of cut may have a unit of in/rev.

The ROP of drill bit 101 is often a function of both weight on bit (WOB) and RPM. Referring to FIG. 1, drill string 103 may apply weight on drill bit 101 and may also rotate drill bit 101 about rotational axis 104 to form a wellbore 114 (e.g., wellbore 114a or wellbore 114b). For some applications a downhole motor (not expressly shown) may be provided as part of BHA 120 to also rotate drill bit 101. The drilling efficiency of drill bit 101 may depend on the location or configuration of cutting elements 128 or blades 126. Accordingly, a downhole drilling model may take into consideration the location, orientation and configuration of cutting elements 128, blades 126, or other components of drill bit 101 in order to model interactions of downhole drilling tools with formations.

Figure 3A:
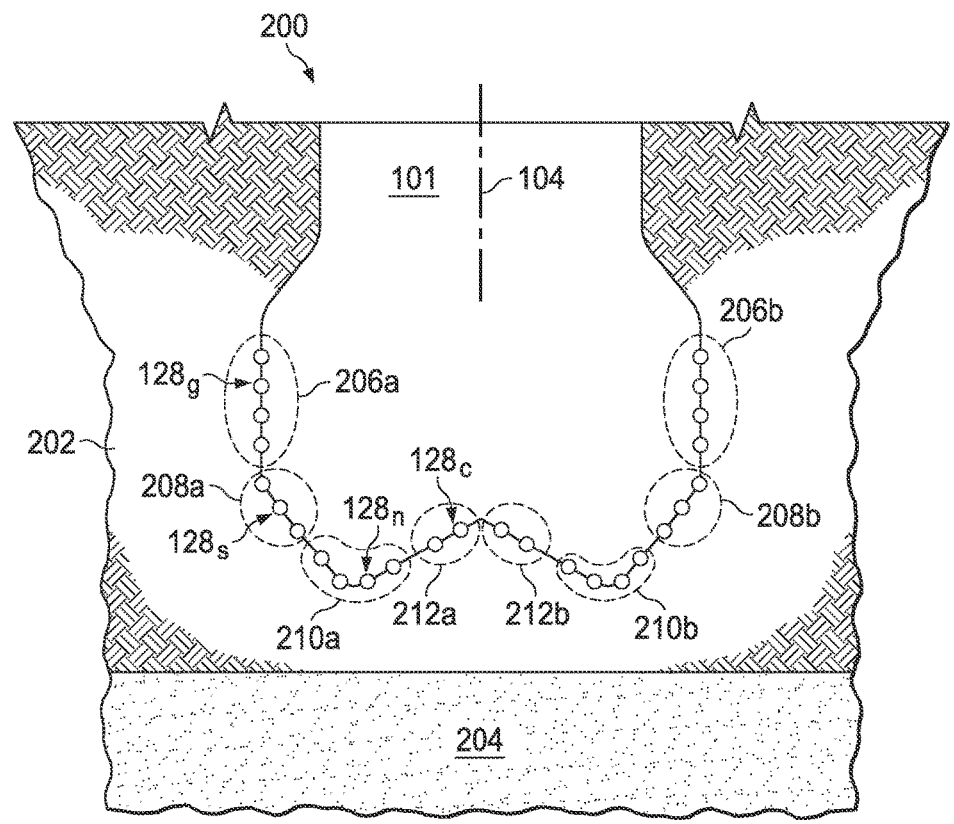
FIG. 3A illustrates a drawing in section and in elevation with portions broken away showing the drill bit of FIG. 2 drilling a wellbore through a first downhole formation and into an adjacent second downhole formation.

FIG. 3A illustrates a drawing in section and in elevation with portions broken away showing drill bit 101 of FIG. 2 drilling a wellbore through a first downhole formation and into an adjacent second downhole formation. Exterior portions of blades (not expressly shown in FIG. 3A) and cutting elements 128 may be projected rotationally onto a radial plane to form bit face profile 200. In the illustrated embodiment, formation layer 202 may be described as "softer" or "less hard" when compared to downhole formation layer 204. As shown in FIG. 3A, exterior portions of drill bit 101 that contact adjacent portions of a downhole formation may be described as a "bit face." Bit face profile 200 of drill bit 101 may include various zones or segments. Bit face profile 200 may be substantially symmetric about bit rotational axis 104 due to the rotational projection of bit face profile 200, such that the zones or segments on one side of rotational axis 104 may be substantially similar to the zones or segments on the opposite side of rotational axis 104.

For example, bit face profile 200 may include gage zone 206a located opposite gage zone 206b, shoulder zone 208a located opposite shoulder zone 208b, nose zone 210a located opposite nose zone 210b, and cone zone 212a located opposite cone zone 212b. Cutting elements 128 included in each zone may be referred to as cutting elements of that zone. For example, cutting elements $128_g$ included in gage zones 206 may be referred to as gage cutting elements, cutting elements $128_s$ included in shoulder zones 208 may be referred to as shoulder cutting elements, cutting elements $128_n$ included in nose zones 210 may be referred to as nose cutting elements, and cutting elements $128_c$ included in cone zones 212 may be referred to as cone cutting elements.

Cone zones 212 may be generally concave and may be formed on exterior portions of each blade (e.g., blades 126 as illustrated in FIG. 1) of drill bit 101, adjacent to and extending out from bit rotational axis 104. Nose zones 210 may be generally convex and may be formed on exterior portions of each blade of drill bit 101, adjacent to and extending from each cone zone 212. Shoulder zones 208 may be formed on exterior portions of each blade 126 extending from respective nose zones 210 and may terminate proximate to a respective gage zone 206. As shown in FIG. 3A, the area of bit face profile 200 may depend on cross-sectional areas associated with zones or segments of bit face profile 200 rather than on a total number of cutting elements, a total number of blades, or cutting areas per cutting element.

Figure 3B:
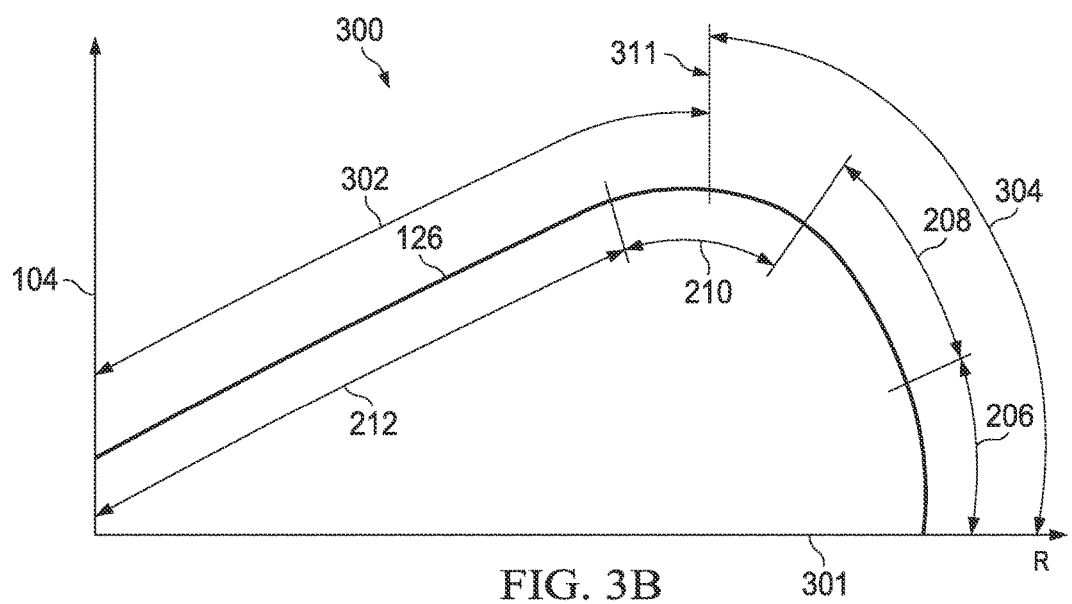
FIG. 3B illustrates a blade profile that represents a cross-sectional view of a blade of a drill bit.

FIG. 3B illustrates blade profile 300 that represents a cross-sectional view of blade 126 of drill bit 101. Blade profile 300 includes cone zone 212, nose zone 210, shoulder zone 208 and gage zone 206 as described above with respect to FIG. 2. Cone zone 212, nose zone 210, shoulder zone 208 and gage zone 206 may be based on their location along blade 126 with respect to rotational axis 104 and horizontal reference line 301 that indicates a distance from rotational axis 104 in a plane perpendicular to rotational axis 104. A comparison of FIGS. 3A and 3B shows that blade profile 300 of FIG. 3B is upside down with respect to bit face profile 200 of FIG. 3A.

Blade profile 300 may include inner zone 302 and outer zone 304. Inner zone 302 may extend outward from rotational axis 104 to nose point 311. Outer zone 304 may extend from nose point 311 to the end of blade 126. Nose point 311 may be the location on blade profile 300 within nose zone 210 that has maximum elevation as measured by bit rotational axis 104 (vertical axis) from reference line 301 (horizontal axis). A coordinate on the graph in FIG. 3B corresponding to rotational axis 104 may be referred to as an axial coordinate or position. A coordinate on the graph in FIG. 3B corresponding to reference line 301 may be referred to as a radial coordinate or radial position that may indicate a distance extending orthogonally from rotational axis 104 in a radial plane passing through rotational axis 104. For example, in FIG. 3B rotational axis 104 may be placed along a z-axis and reference line 301 may indicate the distance (R) extending orthogonally from rotational axis 104 to a point on a radial plane that may be defined as the ZR plane.

FIGS. 3A and 3B are for illustrative purposes only and modifications, additions or omissions may be made to FIGS. 3A and 3B without departing from the scope of the present disclosure. For example, the actual locations of the various zones with respect to the bit face profile may vary and may not be exactly as depicted.

Figure 4A:
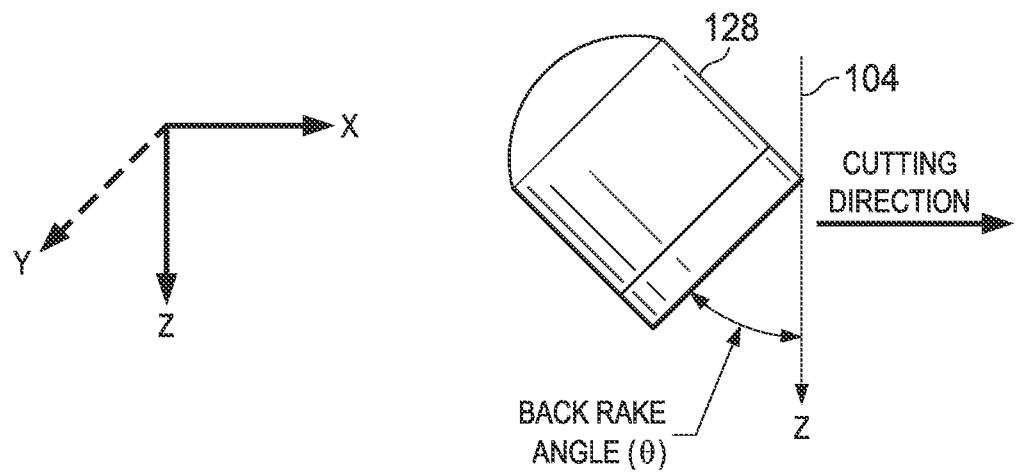
FIG. 4A illustrates a side view of an example cutting element.
Figure 4B:
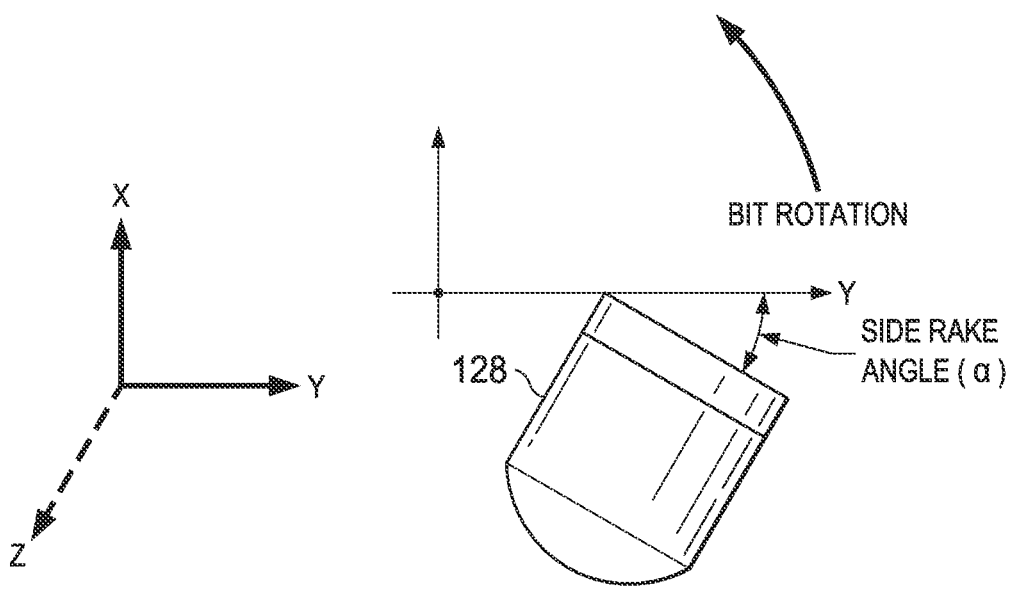
FIG. 4B illustrates a bottom view of an example cutting element.

FIG. 4A illustrates a side view of cutting element 128 depicted in FIGS. 1, 2, and 3A. As shown in FIG. 4A, the back-rake angle ($\theta$) of cutting element 128 may be the angle at which cutting element 128 is oriented as compared to the z-axis (e.g., bit-rotational axis 104). FIG. 4B illustrates a bottom view of cutting element 128 depicted in FIGS. 1, 2, and 3A. As shown in FIG. 4B, the side-rake angle ($\alpha$) of cutting element 128 may be the angle at which cutting element 128 is oriented as compared to the y-axis of an xy-plane that may be perpendicular to the z-axis. Various design parameters of a drill bit or drill bit model (e.g., the back-rake angle and/or the side-rake angle of cutting element 128 in a drill bit or drill bit model) may impact drilling efficiency. Accordingly, as described below with reference to FIGS. 5A-C, such design parameters may be optimized for maximum drilling efficiency.

Figure 5B:
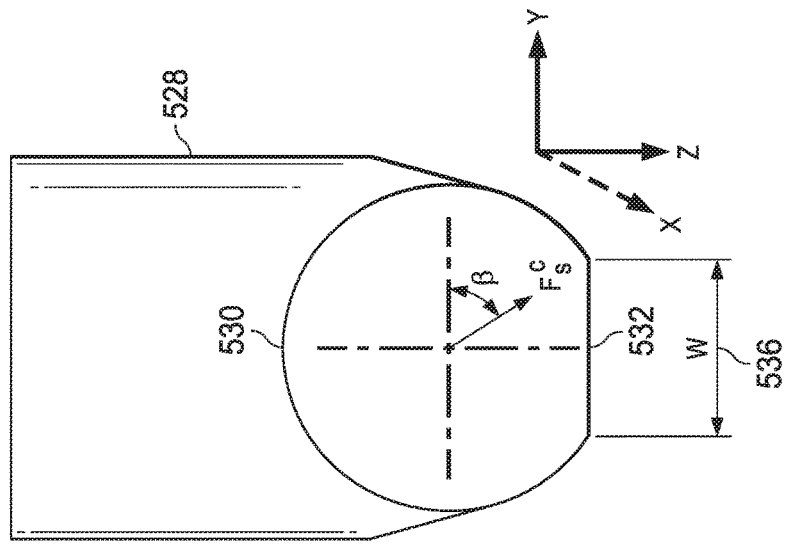
FIG. 5B illustrates a front view of an example cutting element having a wearflat section.
Figure 5A:
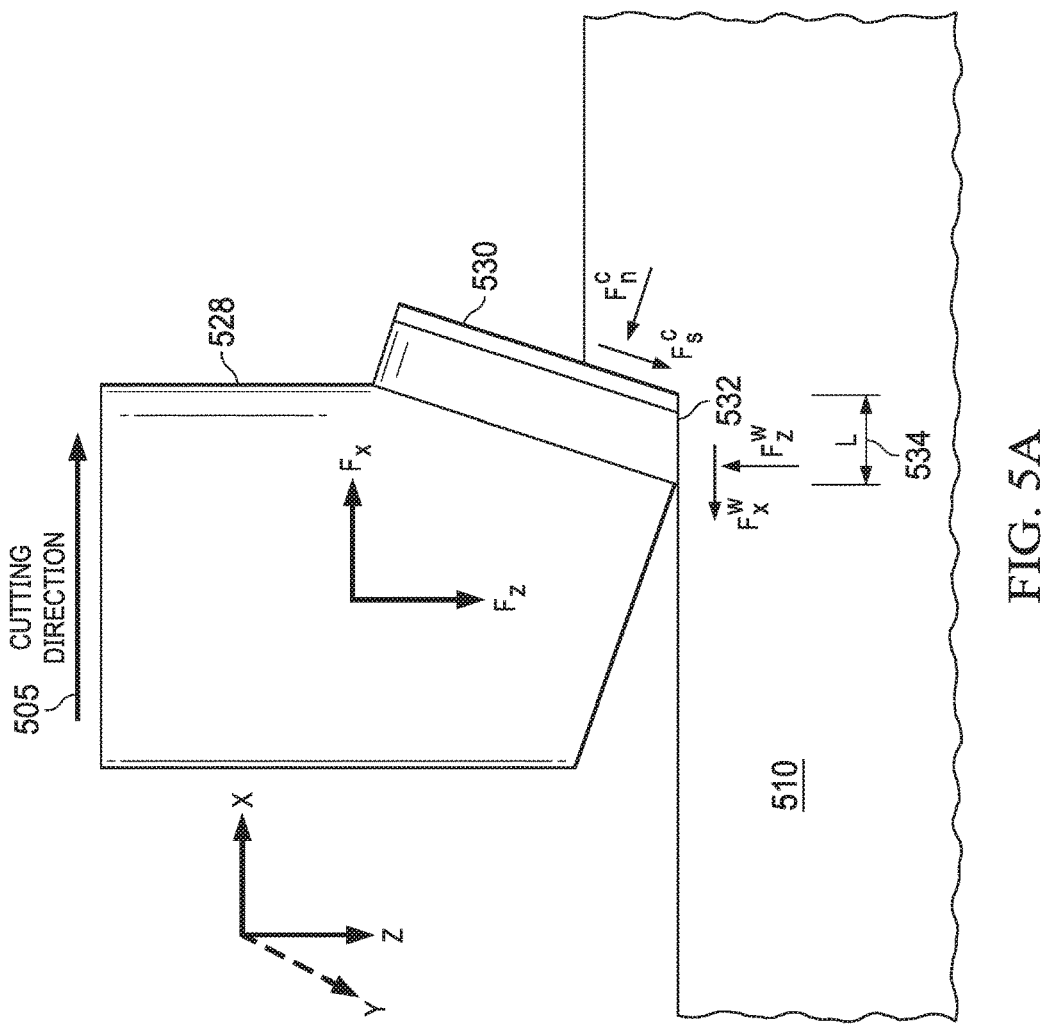
FIG. 5A illustrates a side view of an example cutting element having a wearflat section.

FIG. 5A illustrates a side view of cutting element 528 having wearflat 532. FIG. 5B illustrates a front view of cutting element 528 having wearflat 532. Cutting elements with little or no wear at the tip of the cutting element may be referred to as sharp cutting elements. However, cutting elements of a drill bit may experience wear during drilling operations as the cutting elements interact with and cut into formation at a borehole bottom. For example, wearflat sections may form on the tips of cutting elements of a drill bit. As shown in FIGS. 5A and 5B, the wearflat 532 of a worn cutting element 528 may have length (L) 534 and width (W) 536.

During a drilling operation, wearflat frictional forces may consume drilling energy that would otherwise contribute to the cutting and removal of a subterranean formation. The drilling energy consumed due to wearflat friction may affect the overall drilling efficiency of the downhole drilling tool. Accordingly, to accurately model drilling efficiency for downhole drilling tools having one or more cutting elements with a wearflat section, a downhole drilling tool model accounting for wearflat frictional forces may be utilized. As explained in further detail below with reference to equations one through thirty-six, a system of primary equations accounting for wearflat friction force and the various other forces experienced by a cutting element with a wearflat section may be derived. From the system of primary equations, the efficiency of a downhole drilling tool may be modeled, and one or more drill bit design parameters (e.g., the back-rake angle of a cutting element) may be determined in order to optimize drilling efficiency.

As shown in FIGS. 5A and 5B, wearflat 532 may interact with formation 510 as cutting element 528 moves in the cutting direction 505. For example, as cutting element 528 moves in cutting direction 505, cutting element 528 may experience wearflat frictional forces due to the interaction between wearflat 532 and formation 510. Components of the wearflat forces experienced in the direction of the x-axis and in the direction of the z-axis are denoted as $F_x^w$ and $F_z^w$.

Wearflat forces (e.g., $F_x^w$ and $F_z^w$) and cutting forces (e.g., $F_x^c$ and $F_z^c$), experienced by cutting element 528 due to the interaction between cutting face 530 and formation 510, may be calculated in order to model the drilling efficiency of a downhole drilling tool (e.g., a drill bit) or downhole drilling tool model (e.g., a model of a drill bit). As shown in FIG. 5A, components of the cutting forces may be denoted as $F_n^c$ and $F_s^c$, where $F_n^c$ represents the applied force normal to cutting face 530, and $F_s^c$ represents frictional force experienced along cutting face 530 of cutting element 528.

The cutting forces experienced due to the interaction between cutting face 530 and formation 510 may also be expressed as components along the cutting direction (e.g., the x-axis), the drilling direction (e.g., the z-axis), and the outward direction (e.g., the y-axis). Such components of the cutting forces may be expressed as follows:

$$F_x^c = F_n^c \cos\theta \cos\alpha - F_s^c(\cos\beta \sin\alpha + \cos\alpha \sin\beta \sin\theta), \quad \text{(Eq. 1)}$$

$$F_y^c = F_n^c \cos\theta \sin\alpha + F_s^c(\cos\alpha \cos\beta - \sin\alpha \sin\beta \sin\theta), \quad \text{(Eq. 2)}$$

$$F_z^c = F_n^c \sin\theta + F_s^c \cos\theta \sin\beta, \quad \text{(Eq. 3)}$$

where θ is the back-rake angle, α is the side-rake angle, and β is a friction force angle of $F_s^c$ defined with respect to the y-axis as illustrated in FIG. 5B.

Utilizing equations one through three to solve for $F_s^c$, the interfacial frictional force at the interface of cutting face 530 and formation 510 may be expressed as follows:

$$F_s^c = \frac{F_z^c \cos\alpha - F_x^c \tan\theta}{\cos\alpha \sin\beta \sec\theta + \sin\alpha \cos\beta \tan\theta}. \quad \text{(Eq. 4)}$$

The interfacial frictional force at the interface of cutting face 530 and formation 510 may also be expressed as a function of the normal cutting force ($F_n^c$), as follows:

$$F_s^c = \tan(\psi) F_m^c, \quad \text{(Eq. 5)}$$

where ψ is the cutting-element interfacial friction angle. As described in further detail below with reference to equations thirty-four and thirty-five, the cutting-element front interfacial friction angle (ψ) may depend on other parameters such as the back-rake angle of cutting element 528 (illustrated in FIG. 4A).

Combining equations one, three, and five, the component of the cutting force in the direction of the z-axis (e.g., bit rotational axis 104) may be expressed as follows:

$$F_z^c = \frac{\sin\theta + \cos\theta \sin\beta \tan\psi}{\cos\alpha(\cos\theta - \sin\beta \sin\theta \tan\psi) - \cos\beta \sin\alpha \tan\psi} F_x^c. \quad \text{(Eq. 6)}$$

In some embodiments, side-rake angle (α) may equal zero and frictional force angle (β) may equal π/2. For such embodiments, equation six may be re-written as follows:

$$F_z^c = \tan(\theta + \psi) F_x^c. \quad \text{(Eq. 7)}$$

Figure 5C:
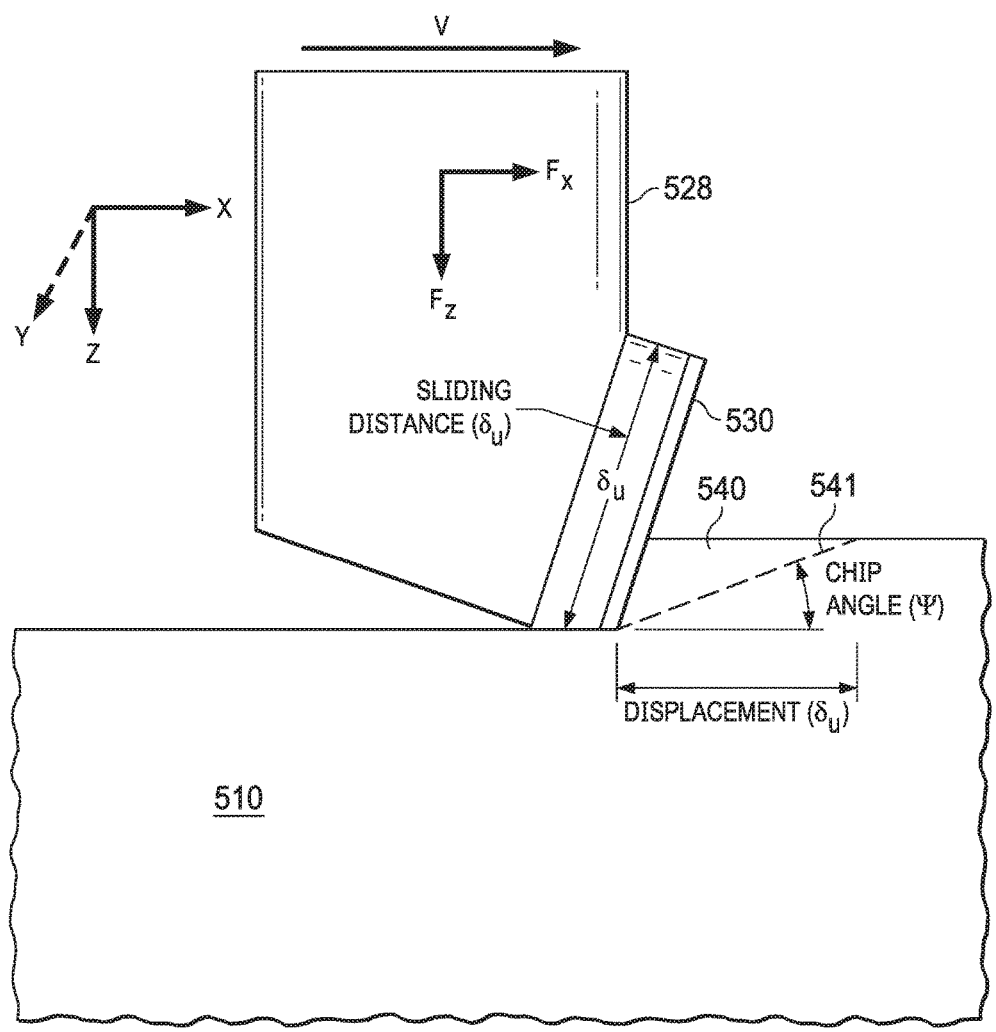
FIG. 5C illustrates a side view of an example cutting element interacting with a formation.

During a modeled drilling cycle, a portion of formation 510 may fracture and break away from formation 510. For example, as shown in FIG. 5C, rock chip 540 may break away from formation 510 along crack line 541. After rock chip 540 breaks away, the remaining portions of formation 510 under rock chip 540 may be crushed into small particles by cutting element 528. For modeling purposes, it may generally be assumed that the removed rock is pushed forward by a modeled displacement (δu) along the cutting direction. Further, once rock chip 540 breaks away from formation 510 during the crushing cycle, rock chip 540 may slide along cutting face 530 by a modeled sliding distance (δs). The cutting forces at the interface of cutting face 530 and formation 510 may be combined respectively with the displacement and sliding distances to determine cutting energy. For example, the energy associated with the cutting force ($F_x^c$) may be expressed as a function of the displacement (δu) in the cutting direction. Similarly, the energy associated with the interfacial friction force ($F_s^c$) may be expressed as a function of the sliding distance (δs).

In accordance with the law of conservation of energy, the cutting energy associated with the normal cutting force ($F_n^c$) and the interfacial friction force ($F_s^c$) associated with cutting face 530 may be modeled as equal to the energy of rock failure for a modeled volume of rock removed from formation 510. The modeled volume of rock removed from formation 510 may include rock chip 540 as well as the portion of formation under rock chip 540 that is crushed and removed by cutting element 528. The energy of the rock failure may be modeled in terms of the strain energy of the removed rock. Accordingly, the cutting energy may be balanced with the rock failure energy and may be expressed by the following energy balance equation:

$$F_x^c \delta u - F_s^c \delta s = \int \epsilon dV, \quad \text{(Eq. 8):}$$

where $\epsilon$ is the strain energy. To simplify the calculation of the strain energy, the strain energy may be modeled such that the strain energy remains constant across the x-axis position of cutting element 528, and such that there may be one representative volume element ("RVE") with no stress variation within the RVE. The strain energy may thus be derived as:

$$\epsilon = \frac{1}{2}\sigma : \varepsilon + (\sigma_z + \sigma_x)\frac{\cos\theta}{\cos\theta - \sin\theta\tan\Psi}\varsigma^2, \quad \text{(Eq. 9)}$$

where $\varsigma$ represents the percentage of the displacement distance ($\delta u$) in a modeled crushing cycle before the rock chip breaks away from the formation.

Substituting equation seven into equation eight yields the following energy balance equation in which strain energy ($\epsilon$) is expressed as a function of x-axis cutting force, $F_x^c$:

$$\frac{F_x^c}{A_c}[1 - \chi(\tan(\theta + \psi)\cos\theta - \sin\theta)] = \epsilon, \quad \text{(Eq. 10)}$$

where $A_c$ is the cross-section area of the cut formed by cutting element 528 in formation 510, and where $\chi$ represents the ratio of sliding distance ($\delta s$) over displacement ($\delta u$) as represented in the following equation:

$$\chi = \left(\frac{\sin\Psi}{\cos(\theta + \Psi)}\frac{\varsigma}{1-\varsigma} + \frac{1-\varsigma}{\sin\theta}\right), \quad \text{(Eq. 11)}$$

where $\varsigma$ represents the percentage of the displacement distance ($\delta u$) in a modeled crushing cycle before the rock chip breaks away from the formation, and $\psi$ represents the chip angle at which the rock chip breaks away from the formation. Equation ten may represent the first of four primary equations utilized to model the forces occurring during the interaction of a cutting element and a formation.

As described below with reference to equation twelve, the total x-axis force ($F_x$) includes both the x-axis cutting force ($F_x^c$) and the wearflat friction force ($F_x^w$). Although the wearflat friction force ($F_x^w$) may consume a portion of the drilling energy that may be externally supplied to cutting element 528 during drilling, the wearflat friction force ($F_x^w$) does not contribute to the removal of rock during drilling. As shown in equation ten, the energy balance equation considers the x-axis cutting force ($F_x^c$), but excludes wearflat friction force ($F_x^w$). Accordingly, the energy balance equation may not be affected by the wearflat friction force ($F_x^w$), which consumes drilling energy supplied to cutting element 528, but does not contribute to the cutting of rock from formation 510.

Further, the energy cost contributed by the interfacial friction force ($F_s^c$) is separately accounted for in the derivation of the energy balance equation, rather than being assumed to be an energy cost of the rock failure. Thus, the cutting energy portion of the energy balance equation may more accurately represent the different cutting forces (e.g., the normal cutting force ($F_n^c$) and the interfacial friction force ($F_s^c$)) contributing to the rock failure.

Referring again to FIG. 5A, total x-axis force ($F_x$) for cutting element 528 may be expressed as the sum of the x-axis component of the cutting force ($F_x^c$) and the x-axis component of the wearflat friction force ($F_x^w$):

$$F_x = F_x^c + F_x^w. \quad \text{(Eq. 12):}$$

Similarly, the total drilling force ($F_z$) for cutting element 528 may be expressed as the sum of the z-axis component of the cutting force ($F_z^c$) and the z-axis component of the wearflat friction force ($F_z^w$):

$$F_z = F_z^c + F_z^w. \quad \text{(Eq. 13)}$$

The wearflat friction force may be expressed as a function of the wearflat force in the direction of the z-axis, as follows:

$$F_x^w = \mu F_z^w, \quad \text{(Eq. 14):}$$

where $\mu$ is a wearflat friction coefficient.

Based on equations twelve, thirteen, and fourteen, the total drag force (e.g., the total x-axis force ($F_x$)), may be expressed by the derivation in equations fifteen and sixteen as follows:

$$F_x = F_x^c + F_x^w = F_x^c + \mu(F_z - F_z^c), \quad \text{(Eq. 15):}$$

$$F_x = F_x^c[1 - \mu\tan(\theta + \psi)] + \mu F_z. \quad \text{(Eq. 16):}$$

Based on an analysis of single cutter experimental results performed at Sandia National Laboratories, wearflat friction may be modeled as a nearly constant value for a given rock type. See David A. Glowka, *Development of a method for predicting the performance and wear of PDC drill bits* (Sandia National Laboratories, 1987). Accordingly, referring back to equation fourteen, the wearflat friction may be modeled as a nearly constant value for a given rock type, regardless of the depth of cut of the cutting element, the wearflat area, and the wearflat type (e.g., field worn, lab worn, or machine ground wearflats). Thus, equation fourteen may be re-written as equation seventeen, which may be utilized as the second of four primary equations:

$$F_x^w = \mu(\overline{F}_z - F_z^c), \quad \text{(Eq. 17):}$$

where $F_z^c$ may be given by equation seven in terms of $F_x^w$ and $\psi$, and where $\overline{F}_z$ is the total drilling force externally supplied to cutting element.

Analysis of the forces at the intersection of cutting face 530 and formation 510 may also include an analysis of a triaxial compression state that may be experienced by the rock at the front of the cutting face 530. In some instances, the vertical force $F_z$ and the horizontal force $F_x$ may be close to the same magnitude in value, and the projected area subjected to the vertical force may be three to four times smaller than the area subjected to the horizontal force. Consequently, the vertical stress ($\sigma_z$) may be several times larger than the horizontal stress ($\sigma_x$). Thus, the vertical stress ($\sigma_z$) may represent the maximum principal stress and the horizontal stress ($\sigma_x$) may represent the minimum principle stress. Further, on some instances, a profile of a groove formed by cutting element 528 in formation 510 closely match the profile of the cutting face 530 of the cutting element 528. Accordingly, it may be assumed that the lateral strain ($\varepsilon_y$) equals zero, and the contact stress ($\sigma$) experienced by the rock at the front of cutting face 530 may be modeled as obeying Hooke's law:

$$\varepsilon_y = \frac{1}{E}[\sigma_y - v(\sigma_z + \sigma_x)], \quad \text{(Eq. 18)}$$

Based on equation eighteen, individual components of the contact stress ($\sigma$) may be expressed as follows:

$$\sigma_z = E(\varepsilon_z - v\varepsilon_x), \quad \text{(Eq. 19)}$$

$$\sigma_x = E(\varepsilon_x - v\varepsilon_z), \quad \text{(Eq. 20)}$$

$$\sigma_y = v(\sigma_x + \sigma_z), \quad \text{(Eq. 21)}$$

where E is Young's modulus, where v is Poisson's ratio, where q is uniaxial compressive strength, and where specific energy ($\varepsilon$) utilized in equations eighteen, nineteen, and twenty, may be expressed as $\varepsilon = F_x/A_c$.

Further, it may be assumed that the crushed rock removed from formation 510 fails according to Griffeth's criterion. Thus, the following relationship may be derived:

$$\sigma_x = (\sigma_z - q)(\sqrt{1+f^2} - f)^2, \quad \text{(Eq. 22)}$$

where $f = \tan\varphi$, and where $\varphi$ is the rock internal friction angle.

Further analyzing the stresses at the intersection of the cutting face 530 and formation 510, the axial stress on cutting face 530 may be modeled as follows:

$$\sigma_z = \xi q + p_m - p_o, \quad \text{(Eq. 23)}$$

where $\xi$ is a cutting element front vertical stress factor, where $p_m$ represents mud pressure within the drilling environment, where $p_o$ represents the pore pressure of the drilling environment, and where q represents the uniaxial compressive strength of the formation 510. Combining equation twenty-three with equations twenty-one and twenty-two, the x-axis and y-axis stresses ($\sigma_x$ and $\sigma_y$) may be determined in terms of the cutting element front vertical stress factor ($\xi$). Further, $\varepsilon_x$ and $\varepsilon_z$ may be determined utilizing equations nineteen and twenty. As described above with reference to equation eighteen, the lateral strain lateral strain ($\varepsilon_y$) may equal zero, and thus $\sigma_y\varepsilon_y$ may equal zero. Accordingly, $\sigma:\varepsilon$ may be summed as follows:

$$\sigma:\varepsilon = \sigma_z\varepsilon_z + \sigma_x\varepsilon_x. \quad \text{(Eq. 24)}$$

Based on the different stress components as described in equations twenty through twenty-four, total stress at the interface of cutting face 530 and formation 510 may be expressed as:

$$\sigma_c = \sigma_x(\cos\theta\cos\alpha)^2 + \sigma_y(\cos\theta\sin\alpha)^2 + \sigma_z(\sin\theta)^2 \quad \text{(Eq. 25)}$$

The normal cutting force ($F_n^c$) may be expressed as a function of the total stress ($\sigma_c$) and the cross-section area ($A_c$) of the cut formed by cutting element 528:

$$F_n^c = \sigma_c A_c/(\cos\theta\cos\alpha) \quad \text{(Eq. 26)}$$

Further, the interfacial friction between formation 510 and cutting face 530 may be expressed as a function of the normal cutting force as follows:

$$F_s^c = \tan(\psi)F_n^c \quad \text{(Eq. 27)}$$

With the normal cutting force ($F_n^c$) and the interfacial friction force ($F_s^c$) solved in equations twenty-six and twenty-seven, reference may be made back to equations one and fourteen to derive a relationship between the wear flat friction ($F_x^w$), the normal cutting force ($F_n^c$), and the interfacial friction ($F_s^c$). For example, equation fourteen may be re-written as follows:

$$\overline{F}_x - F_x^w = F_x^c, \quad \text{(Eq. 28)}$$

where $\overline{F}_x$ is an experimentally measured dragging force. Further, equation twenty-eight may be substituted into equation one, and the following third primary equation may then be derived:

$$\overline{F}_x - F_x^w = F_n^c\cos\theta\cos\alpha - F_s^c(\cos\beta\sin\alpha + \cos\alpha\sin\theta) \quad \text{(Eq. 29)}$$

Mechanical systems and interactions, such as the cutting and crushing of formation 510, may obey the fourth law of thermodynamics, which states that a system will select the path out of available paths that maximizes the entropy at the fastest rate given the constraints. For the purposes of the present disclosure, the fourth law of thermodynamics may be represented by equation thirty below. Equation thirty may illustrate that, given the cutting forces, among all admissible modes of deformation for the removed rock, the removed rock may fail in the mode of deformation that maximizes the actual dragging force, and thus yields the most efficient mode of energy release.

$$\frac{dF_x^c}{d\varsigma} = 0. \quad \text{(Eq. 30)}$$

Equation thirty may provide the fourth of four primary equations with which the interaction between cutting element 528 and formation 510 may be modeled. Accordingly, the system of primary equations may be restated as follows:

$$\frac{F_x^c}{A_c}[1 - \chi(\tan(\theta+\psi)\cos\theta - \sin\theta)] = \mathcal{E}, \quad \text{(Eq. 10)}$$

$$F_x^w = \mu(\overline{F}_z - F_z^c), \quad \text{(Eq. 17)}$$

$$\overline{F}_x - F_x^w = \quad \text{(Eq. 29)}$$
$$F_n^c\cos\theta\cos\alpha - F_s^c(\cos\beta\sin\alpha + \cos\alpha\sin\beta\sin\theta),$$

and $$\frac{dF_x^c}{d\varsigma} = 0. \quad \text{(Eq. 30)}$$

Within the system of primary equations, the variables to be solved may include the cutting element front vertical stress factor ($\xi$), the cutting element front interface friction angle ($\psi$), the wearflat friction force ($F_x^w$), and the percentage of the rock chip sliding distance before the rock chip breaks ($\varsigma$). These variables may be solved, for example, based on experimental results measuring the cutting forces (e.g., $\overline{F}_x$ and $\overline{F}_z$). As described in further detail below with reference to FIG. 6, the system of primary equations may be utilized to solve for variables related to cutting element 528. Further, the primary equations and the various force equations described herein, and repeated below with reference to FIG. 6, may then be utilized to calculate the various forces associated with the interaction of cutting element 528 with formation 510 during drilling.

For example, based on the system of primary equations, the effective cutting efficiency of cutting element 528 may be analyzed and modeled as a function of various design parameters (e.g., back rack angle). Based on primary equation ten, the effective energy consumption of the formation 510, when being cut, may be expressed $$e = [1 - \chi(\tan(\theta+\psi)\cos\theta - \sin\theta)] = \frac{\mathcal{E}}{F_x^c/A_c} \quad \text{(Eq. 31)}$$

where e represents the effective energy consumption of the removed rock. The calculation of the effective energy consumption of the removed rock (e) may exclude the wearflat friction force ($F_x^w$) to prevent affecting the calculation with a force that does not contribute to the failure of the rock during cutting. By comparison to equation thirty-one, the effective energy efficiency ($\bar{e}$) may be defined with respect to the total external drilling energy (including the drilling energy supplied to the cutting element to overcome the wearflat friction force) as follows:

$$\bar{e} = \frac{\varepsilon}{F_x/A_c}. \qquad \text{(Eq. 32)}$$

For a given x-axis cutting force ($F_x^c$), the drilling efficiency of cutting element 528 may be optimized by adjusting design parameters to maximize the effective energy consumption (e). For example, the optimal back-rake angle (θ) may be determined by solving for the back-rake angle after calculating the derivative of the effective energy consumption (e) over the derivative of the back-rake angle equal to zero as follows:

$$\frac{de}{d\theta} = 0. \qquad \text{(Eq. 33)}$$

In some embodiments, the cutting element front interface friction angle (ψ) may be modeled as a function of back-rake angle (θ), and χ from equation thirty-one may be modeled as a constant. Thus, equation thirty-three may be re-written as follows:

$$\frac{d\psi}{d\theta} = \frac{\sin[2(\theta+\psi)]}{\sin(2\theta)} \qquad \text{(Eq. 34)}$$

With equation thirty-four, and a known relationship between the cutting element front interface friction angle (ψ) and the back-rake angle (θ), the optimal back-rake angle (θ) may be determined. For example, for some embodiments of cutting element 528 engaging with a given type of rock at depths of cut ranging from 0.1 to 1.0 mm, the cutting element front interface friction angle (ψ) may be modeled as a function of back-rake angle (θ) as follows:

$$\psi = 40 - 1.45(\theta). \qquad \text{(Eq. 35)}$$

Accordingly, the optimal back-rake angle for such embodiments of cutting element 528 may be calculated to be approximately 18.8 degrees to maximize the effective energy consumption (e). Although the above calculation of an optimized back-rake angle was performed for a given type of rock at depths of cut within a specified range, the steps described above for determining an optimum back-rake angle may be generally applied for any conditions, including any determined relationship between the cutting element front interface friction angle (ψ) and the back-rake angle (θ) for a type of rock and a range of depths of cut.

FIG. 6 illustrates a block diagram of an exemplary downhole drilling tool modeling system 600. Downhole drilling tool modeling system 600 may be configured to perform three dimensional modeling of interactions between the cutting elements (e.g., cutting element 528) of a drill bit and formations (e.g., formation 510).

Downhole drilling tool modeling system 600 may include modeling module 602. Modeling module 602 may include any suitable components. For example, modeling module 602 may include processor 604. Processor 604 may include, for example, a microprocessor, microcontroller, digital signal processor (DSP), application specific integrated circuit (ASIC), or any other digital or analog circuitry configured to interpret and/or execute program instructions and/or process data. Processor 604 may be communicatively coupled to memory 606. Processor 604 may be configured to interpret and/or execute program instructions and/or data stored in memory 606. Program instructions or data may constitute portions of software for carrying out modeling of the interaction between a formation and a cutting element of a drill bit, as described herein.

Downhole drilling tool modeling system 600 may further include bit design database 608. Bit design database 608 may be communicatively coupled to modeling module 602 and may provide downhole drilling tool designs 610a-610c (e.g., designs of drill bit 101) in response to a query or call by modeling module 602. Drill bit designs 610a-610c may be implemented in any suitable manner, such as by parameters, functions, definitions, instructions, logic, or code, and may be stored in, for example, a database, file, application programming interface, library, shared library, record, data structure, service, software-as-service, or any other suitable mechanism. Drill bit designs 610a-610c may specify any suitable configuration of components of a drill bit, such as, for example, components of drill bit 101, discussed above with reference to FIG. 1, 2, or 3A. Although bit design database 608 is illustrated as including three drill bit designs, bit design database 608 may contain any suitable number of drill bit designs.

Downhole drilling tool modeling system 600 may further include rock property database 612. Rock property database 612 may be communicatively coupled to modeling module 602 and may provide rock property parameters 614a-614c in response to a query or call by modeling module 602. Rock property parameters 614a-614c may be implemented in any suitable manner, such as by parameters, functions, definitions, instructions, logic, or code, and may be stored in, for example, a database, file, application programming interface, library, shared library, record, data structure, service, software-as-service, or any other suitable mechanism. Rock property parameters 614a-614c may specify any suitable properties or parameters of geological formations, such as rock compressive strength (e.g., the uniaxial compressive strength), rock shear strength, rock failure mode, porosity, rock strength, or density. Rock property parameters 614a-614c may further include parameters specifying rock chip angles, such as the chip angle of rock chip 540 (discussed above with reference to FIG. 5C) associated with any suitable combinations of drilling parameters or formation properties. Although rock property database 612 is illustrated as including three instances of rock property parameters, rock property database 612 may contain any suitable number of instances of rock property parameters.

Modeling module 602 may be configured to cause processor 606 to model various forces occurring during, for example, the modeled interaction of cutting element 528 and formation 510.

Modeling module 602 may assume constant values for the cutting element front interface friction angle (ψ) and/or the wearflat friction coefficient (μ). Modeling module 602 may derive certain parameters, such as the cutting element front interface friction angle (ψ), from the primary equations described above with reference to FIGS. 5A-C. Modeling module 602 may also retrieve certain parameters, such as the wearflat friction coefficient (μ), from storage in a database (e.g., bit design database 608 or rock property database 612). In some embodiments, parameters such as the wearflat friction coefficient (μ) for a cutting element of a drill bit design may be stored in the bit design database 608 after, for example, being determined based on experimental test results.

Modeling module 602 may also model the nominal wearflat contact stress ($\sigma^w$) of a cutting element based on the following experimental exponential relationship:

$$\sigma^w/q = a[1-\exp(DOC/b)], \quad \text{(Eq. 36)}:$$

where DOC is the depth of cut, q represents the uniaxial compressive strength of the rock, and b is a cutting force coefficient. In some embodiments, "a" and "b" may be determined based on a back analysis of experimental data for a given set of cutting element and rock property parameters. In addition to modeling the nominal wearflat contact stress ($\sigma^w$), modeling module 602 may solve for the cutting element vertical stress factor ($\xi$) on the front of the cutting element, and the percentage of rock chip sliding distance before breaking ($\varsigma$) based, for example, on the primary equations described above with reference to FIGS. 5A-C. Modeling module 602 may then predict the forces for a cutting element of a drill bit design using, for example, equations described above and repeated as follows:

$$\sigma_z = \xi q + p_m - p_o, \quad \text{(Eq. 23)}:$$

$$\sigma_x = (\sigma_z - q)(\sqrt{1+f^2} - f)^2, \quad \text{(Eq. 22)}:$$

$$\sigma_y = \nu(\sigma_x + \sigma_z), \quad \text{(Eq. 21)}:$$

$$\sigma_c = \sigma_x(\cos\theta\cos\alpha)^2 + \sigma_y(\cos\theta\sin\alpha)^2 + \sigma_z(\sin\theta)^2, \quad \text{(Eq. 25)}:$$

$$F_n^c = \sigma_c A_c/(\cos\theta\cos\alpha), \quad \text{(Eq. 26)}:$$

$$F_s^c = \tan(\psi)F_n^c, \quad \text{(Eq. 27)}:$$

$$F_x^c = F_n^c \cos\theta\cos\alpha - F_s^c(\cos\beta\sin\alpha + \cos\alpha\sin\beta\sin\theta), \quad \text{(Eq. 1)}:$$

$$F_y^c = F_n^c \cos\theta\sin\alpha + F_s^c(\cos\alpha\cos\beta - \sin\alpha\sin\beta\sin\theta), \text{ and} \quad \text{(Eq. 2)}:$$

$$F_z^c = F_n^c \sin\theta + F_s^c \cos\theta\sin\beta. \quad \text{(Eq. 3)}:$$

Based on the various forces occurring due to the interaction between a cutting element (e.g., cutting element 528) and a formation (e.g., formation 510), the total cutting forces on the x-axis and on the z-axis may be determined by modeling module 602 based on, for example, equations as follows:

$$F_z = F_x^c + \mu\sigma^w A_w, \quad \text{(Eq. 37)}:$$

$$F_z = F_z^c + \sigma^w A_w, \quad \text{(Eq. 38)}:$$

where $A_w$ is the nominal contact area of the wearflat.

Sharp cutting elements, on which a wearflat section has not yet formed, may not experience wearflat friction ($F_x^w$) as described herein, but may nonetheless experience tip friction at a small but finite area that contacts a formation at the tip of the cutting element. For such sharp cutting elements, the $A_w$ value in equations thirty-seven and thirty-eight may be replaced by the fraction of the total cutting area represented by the tip, rather than being represented by a wearflat contact area value of zero. The fraction may be determined, for example, based on sharp single cutter experiments.

In addition to calculating forces, modeling module 602 may be configured to estimate a drilling efficiency of the downhole drilling tool model based on the modeled forces occurring during the interaction between the cutting elements and the formation at a borehole bottom. For example, modeling module 602 may be configured to calculate the effective cutting efficiency of one or more cutting elements of a downhole drilling tool (e.g., drill bit 101), as described above with reference to equations thirty-one and thirty-two.

Modeling module 602 may also be configured to determine an optimal value for one or more design parameters to maximize the efficiency of the downhole drilling tool model. Further, modeling module 602 may be configured to modify a design parameter of the downhole drilling tool model based on the design parameter value that was determined to maximize efficiency. For example, as described above with reference to equations thirty-four and thirty-five, modeling module 602 may be configured to determine an optimal back-rake value for a cutting element of a downhole drilling tool to maximize the drilling efficiency. After determining the optimal back-rake angle for a cutting element of the downhole drilling tool model, modeling module may set the back-rake angle for the cutting element in the downhole drilling tool model to the determined optimal value. Although equations thirty-four and thirty-five illustrate calculations for optimizing a back-rake angle, modeling module 602 may determine the optimal value for any design parameter (e.g., the side rake angle or depth of cut) to maximize efficiency, and may modify a downhole drilling tool model according to the optimized design parameter.

Further, modeling module 602 may be configured to calculate drilling efficiencies for multiple instances of drill bit designs 610a-610c, where each instance of drill bit design 610a-610c may be modeled based on a particular set of rock property parameters 614a-614c. Modeling module 602 may be configured to calculate drilling efficiencies for a particular instance of drill bit design 610a-610c, based on various different instances of rock property parameters 614a-614c. In embodiments where modeling module 602 is configured to model more than one drill bit design-rock property combination, modeling module 602 may be further configured to indicate or select a drill bit design with the highest efficiency. Modeling module 602 may be configured to rank or order drill bit designs by modeled drilling efficiency. Modeling module 602 may be communicatively coupled to various displays 616 such that information processed by modeling module 602 (e.g., drill bit efficiency) may be conveyed to designers and/or operators of drilling equipment.

Figure 7:
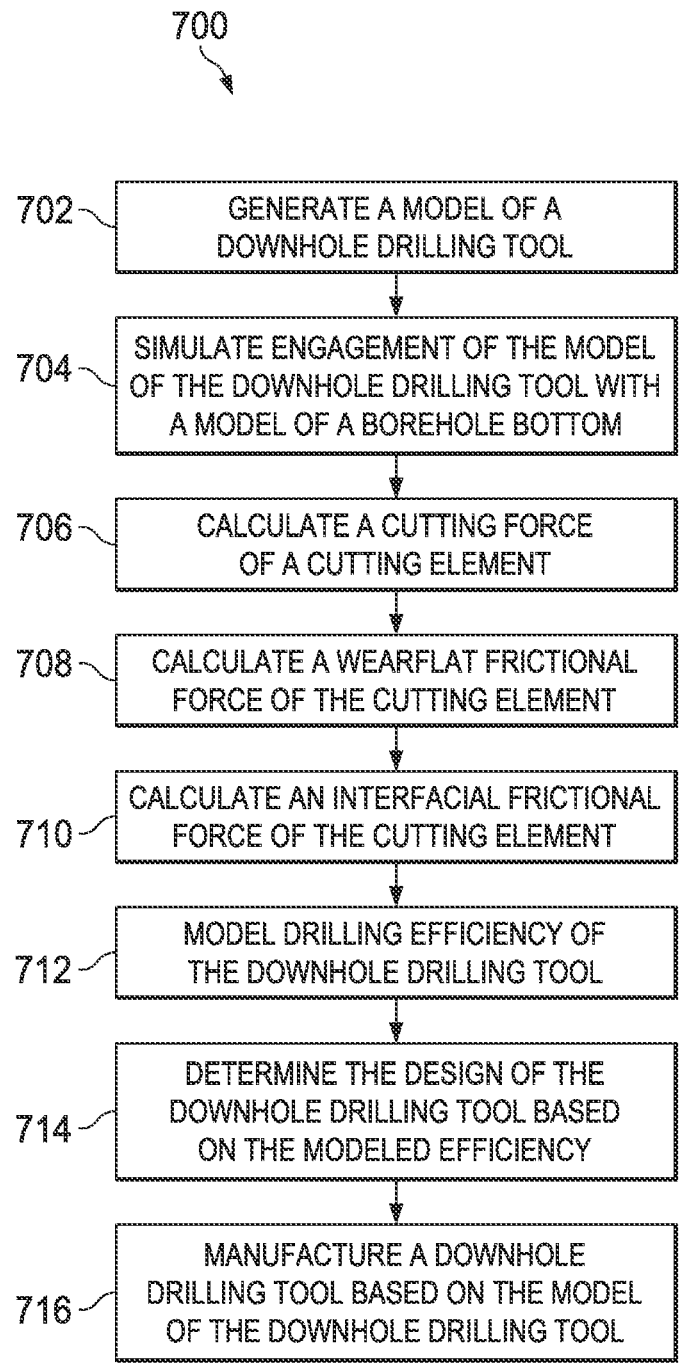
FIG. 7 illustrates a flow chart of an exemplary method for modeling interactions between cutting elements of a drill bit and a geological formation and designing a downhole drilling tool based on the modeled interactions.

FIG. 7 illustrates a flow chart of an exemplary method 700 for modeling interactions between cutting elements of a downhole drilling tool (e.g., cutting elements of drill bit 101) and a geological formation and designing a downhole drilling tool based on the interactions. In the illustrated embodiment the cutting elements of the drill bit, including at least the locations and orientations of all cutting elements, may have been incorporated in an initial design, which may be based on a design for a previously manufactured downhole drilling tool. However, method 700 may include steps for modifying the design of the drill bit, including for example, modifying the back-rake angle of one or more cutting elements on the drill bit.

The steps of method 700 may be performed to simulate, design, and manufacture downhole drilling tools. For example, some steps of method 700 may be performed by downhole drilling tool modeling system 600, discussed above with reference to FIG. 6. The programs and models may include instructions stored on a computer readable medium and operable to perform, when executed by a processor, one or more of the steps described below. The computer readable media may include any system, apparatus or device configured to store and retrieve programs or instructions such as a hard disk drive, a compact disc, flash memory or any other suitable device. The programs and models may be configured to direct a processor or other suitable unit to retrieve and execute the instructions from the computer readable media.

At step 702, a three dimensional (3D) downhole drilling tool model may be generated. For example, the downhole drilling tool model may include a drill bit design, such as one of drill bit designs 610a-610c of FIG. 6. A drill bit design may include a representation of a configuration of blades and cutting elements, such as those shown in FIGS. 1, 2, and 3A. Further, a drill bit design may include coordinate locations of cutting elements with reference to a bit rotational axis. Coordinate locations may be implemented in polar, Cartesian, or spherical coordinate systems.

At step 704, an engagement of the model of the downhole drilling tool with a model of a borehole bottom may be simulated. For example, the downhole drilling tool model may engage the model of the borehole bottom in a simulation of a full revolution of the drill bit design with ROP equal to zero.

At step 706, a cutting force of a cutting element of the three dimensional drilling tool model may be calculated. As described above with reference to equations ten and thirty, the cutting force of the cutting element may be calculated based on an energy balance equation. In accordance with the law of conservation of mass, the cutting energy of cutting element 528 must equal the energy of the failure of the volume of rock removed from formation 510. As further described above with reference to equation twelve, the total x-axis force ($F_x$) may include both the x-axis cutting force ($F_x^c$) and the wearflat friction force ($F_x^w$). Although the wearflat friction force ($F_x^w$) may consume a portion of the drilling energy that may be externally supplied to cutting element 528 during drilling, the wearflat friction force ($F_x^w$) may not contribute to the removal of rock from formation 510 during drilling. Thus, as shown in equation ten, the energy balance equation considers the x-axis cutting force ($F_x^c$), but excludes wearflat friction force ($F_x^w$). Accordingly, the energy balance equation is not affected by the wearflat friction force ($F_x^w$), which consumes drilling energy but does not contribute to the cutting of rock from formation 510. Without being affected by the wearflat friction force ($F_x^w$), the energy balance equation may more accurately model the cutting force of cutting element 528.

At step 708, a wearflat frictional force of the cutting element of the three dimensional drilling tool model may be calculated based on the nominal wearflat contact stress as experimentally determined by equation thirty-six. As described above with reference to step 706, the calculation of the cutting force of cutting element 528 may be independent from the wearflat frictional force of cutting element 528. Accordingly, the wearflat frictional force of the cutting element may be determined based on calculations separate from the calculation of the cutting force. For example, modeling module 602 may calculate cutting forces associated with the cutting element based on, for example, equations including but not limited to one or more of equations twelve, thirteen, fifteen, seventeen, twenty-eight, twenty-nine, and thirty-two, as disclosed herein.

At step 710, an interfacial frictional force of the cutting element of the three dimensional drilling tool model may be calculated. For example, modeling module 602 may solve for parameters associated with the interfacial frictional force associated with the cutting element using primary equations including but not limited to equations ten, seventeen, twenty-nine, and thirty, as disclosed herein. Further, modeling module 602 may calculate the interfacial friction force associated with the cutting element based on, for example, equations including but not limited to one or more of equations one through five, eight, and twenty-seven, as disclosed herein.

At step 712, the drilling efficiency of the downhole drilling tool model may be modeled. The modeled drilling efficiency may be based on the cutting force calculated in step 706 and/or the wearflat frictional force calculated in step 708. The modeled drilling efficiency may also be based on the interfacial frictional force calculated in step 710.

At step 714, a design parameter of the downhole drilling tool model may be modified based on the drilling efficiency of the downhole drilling tool model. For example the back-rake angle of the cutting element may be modified in order to optimize efficiency, as described above with reference to equations thirty-four and thirty-five.

At step 716 a downhole drilling tool may be manufactured based on the downhole drilling tool model. The downhole drilling tool may implement design parameters modified, for example, during step 714.

Steps of method 700 may be repeated for modeling efficiency of one or more drill bits or drill bit designs. Accordingly, drilling efficiencies of multiple drill bits or drill bit designs may be evaluated and compared. Further, steps of method 700 may be repeated for a single design which is iteratively altered in order to maximize drilling efficiency. Alternatively, steps of method 700 may be used to select among existing drill bit designs or drill bits to select a more efficient bit for a particular set of drilling parameters. Once one or more drill bit efficiencies are modeled using certain steps of method 700, a drill bit may be manufactured according to the calculated design constraints to provide a more efficient drill bit. Modifications, additions or omissions may be made to method 700 without departing from the scope of the disclosure.

In a specific embodiment, elements of which may be used in combination with other embodiments, the disclosure relates to a computer-implemented method of designing a downhole drilling tool, including generating a three dimensional (3D) downhole drilling tool model including a plurality of cutting elements on a plurality of blades and simulating engagement of the 3D downhole drilling tool model with a 3D model of a borehole bottom, calculating a cutting force of a cutting element of the plurality of cutting elements, calculating a wearflat frictional force of the cutting element, modeling a drilling efficiency of the 3D downhole drilling tool model based on the cutting force of the cutting element and the wearflat friction force of the cutting element, and determining a design parameter of the 3D downhole drilling tool model based on the drilling efficiency of the 3D downhole drilling tool model. Calculating the cutting force may comprise calculating a contact stress on a cutting face of the cutting element. The method may further include calculating an interfacial friction force on a cutting face of the cutting element, and modeling the drilling efficiency of the 3D downhole drilling tool model based further on the interfacial friction force. In addition, the method may include calculating the cutting force based on a comparison of a cutting energy associated with the cutting element and a failure energy of a volume of formation in the 3D model of the borehole bottom. The failure energy may be based on a strain energy of the volume of rock in the 3D model of the borehole bottom. The method may also include determining a back-rake angle of the cutting element based on the drilling efficiency of the 3D downhole drilling tool model. Further, the method may include manufacturing a drill bit based on the 3D downhole drilling tool model.

In another specific embodiment, elements of which may be used in combination with other embodiments, the disclosure relates to a non-transitory machine-readable medium comprising instructions stored therein, the instructions executable by one or more processors to facilitate performing a method for designing a downhole drilling tool. The method for designing a downhole drilling tool may include generating a three dimensional (3D) downhole drilling tool model including a plurality of cutting elements on a plurality of blades and simulating engagement of the 3D downhole drilling tool model with a 3D model of a borehole bottom, calculating a cutting force of a cutting element of the plurality of cutting elements, calculating a wearflat frictional force of the cutting element, modeling a drilling efficiency of the 3D downhole drilling tool model based on the cutting force of the cutting element and the wearflat friction force of the cutting element, and determining a design parameter of the 3D downhole drilling tool model based on the drilling efficiency of the 3D downhole drilling tool model. Calculating the cutting force may comprise calculating a contact stress on a cutting face of the cutting element. The method may further include calculating an interfacial friction force on a cutting face of the cutting element, and modeling the drilling efficiency of the 3D downhole drilling tool model based further on the interfacial friction force. In addition, the method may include calculating the cutting force based on a comparison of a cutting energy associated with the cutting element and a failure energy of a volume of formation in the 3D model of the borehole bottom. The failure energy may be based on a strain energy of the volume of rock in the 3D model of the borehole bottom. The method may also include determining a back-rake angle of the cutting element based on the drilling efficiency of the 3D downhole drilling tool model.

In yet another specific embodiment, elements of which may be used in combination with other embodiments, the disclosure relates to a downhole drilling tool modeling system, including a processor and a memory communicatively coupled to the processor with computer program instructions stored therein. The instructions may be configured to, when executed by the processor, cause the processor to generate a three dimensional (3D) downhole drilling tool model including a plurality of cutting elements on a plurality of blades, simulate engagement of the 3D downhole drilling tool model with a 3D model of a borehole bottom, calculate a cutting force of a cutting element of the plurality of cutting elements, calculate a wearflat frictional force of the cutting element, model a drilling efficiency of the 3D downhole drilling tool model based on the cutting force of the cutting element and the wearflat friction force of the cutting element, and determine a design parameter of the 3D downhole drilling tool model based on the drilling efficiency of the 3D downhole drilling tool model. Calculating the cutting force may comprise calculating a contact stress on a cutting face of the cutting element. The instructions may be further configured to cause the processor to calculate an interfacial friction force on a cutting face of the cutting element, and to model the drilling efficiency of the 3D downhole drilling tool model based further on the interfacial friction force. The instructions may be also configured to cause the processor to calculate the cutting force based on a comparison of a cutting energy associated with the cutting element and a failure energy of a volume of formation in the 3D model of the borehole bottom. The failure energy may be based on a strain energy of the volume of rock in the 3D model of the borehole bottom.

Although the present disclosure has been described with several embodiments, various changes and modifications may be suggested to one skilled in the art. For example, although the present disclosure describes the configurations of cutting elements with respect to drill bits, the same principles may be used to model the efficiency of any suitable drilling tool according to the present disclosure. It is intended that the present disclosure encompasses such changes and modifications as fall within the scope of the appended claims.

What is claimed is:

1. A computer-implemented method of designing a downhole drilling tool, the method comprising:
   generating a three dimensional (3D) downhole drilling tool model including a plurality of cutting elements on a plurality of blades;
   simulating engagement of the 3D downhole drilling tool model with a 3D model of a borehole bottom;
   calculating a cutting force of a cutting element of the plurality of cutting elements based on a comparison of a cutting energy associated with the cutting element and a failure energy of a volume of formation in the 3D model of the borehole bottom;
   calculating a wearflat frictional force of the cutting element;
   modeling a drilling efficiency of the 3D downhole drilling tool model based on the cutting force of the cutting element and the wearflat friction force of the cutting element;
   determining a design parameter of the 3D downhole drilling tool model based on the drilling efficiency of the 3D downhole drilling tool model;
   adjusting the 3D downhole drilling tool model based on the determined design parameter; and
   manufacturing a drill bit based on the 3D downhole drilling tool model.

2. The method of claim 1, further comprising calculating an interfacial friction force on a cutting face of the cutting element.

3. The method of claim 2, further comprising modeling the drilling efficiency of the 3D downhole drilling tool model based further on the interfacial friction force.

4. The method of claim 1, wherein calculating the cutting force comprises calculating a contact stress on a cutting face of the cutting element.

5. The method of claim 1, wherein the failure energy is based on a strain energy of the volume of rock in the 3D model of the borehole bottom.

6. The method of claim 1, further comprising determining a back-rake angle of the cutting element based on the drilling efficiency of the 3D downhole drilling tool model.

* * * * *